2,912,332
STABILIZED THIAMINE COMPOSITION AND METHOD OF ENRICHING FOOD PRODUCTS

Harland H. Young, Western Springs, and William Floyd Ramseyer, Jr., Tinley Park, Ill., assignors to Swift & Company, Chicago, Ill., a corporation of Illinois No Drawing. Application February 27, 1958
Serial No. 717,842

10 Claims. (Cl. 99—11)

This invention relates to a stabilized vitamin preparation and to a method for producing the same. More particularly, the invention relates to a vitamin preparation in which the vitamin potency is protected against deterioration and degradation resulting from contact of the vitamin with certain sulfur compounds derived from sulfurous acid.

Vitamin $B_1$ or thiamine and its water soluble salts such as hydrochloride, nitrate, phosphate, acetate, etc., occur naturally in many food materials such as fruits, lean meats, and vegetables. This vitamin is a required element in the diet, and any treatment of a food product which results in diminishing the potency of this vitamin or in destruction of the vitamin is undesirable.

Nevertheless, the treatment of many food products with sulfur compounds, specifically derivatives of sulfurous acid, has been recommended in the past because of the effectiveness of these materials as sterilizing agents and color and flavor improvers. These derivatives of sulfurous acid, such as sulfur dioxide and water soluble sulfites and bisulfites, are objectionable in food products because they destroy thiamine normally present in the food, and the addition of more thiamine is ineffective in maintaining thiamine potency since only a very small amount of residual sulfur containing material is necessary to destroy this added thiamine. Ordinarily, food products which have been treated with derivatives of sulfurous acid contain enough of the sulfurous acid derivative to destroy an appreciable amount of thiamine, and attempts to add additional thiamine to supplement foods in which the naturally occurring thiamine has been destroyed are uneconomical.

It is therefore an object of this invention to provide a stabilized vitamin composition protected against the degradative effect of sulfurous acid derivatives.

Another object is to provide a method for producing a dry, edible, stabilized vitamin preparation well adapted for incorporation in food products.

Still another object is to provide a method for processing food products whereby flavor, odor, and palatability of the product are enhanced and the natural vitamin content of the product is maintained or increased.

Additional objects, if not specifically set forth herein, will be readily apparent to one skilled in the art from the detailed description which follows.

Generally, it is within the contemplation of the present invention to provide a method for fortifying the vitamin content of a food product which contains dissolved sulfur dioxide or water soluble sulfites or bisulfites. This fortification is provided by a stabilized thiamine composition comprising a minor amount of thiamine dispersed in a major amount of an insolubilized protein matrix, said matrix also containing an acceptor for sulfites, bisulfites, and sulfur dioxide. There is thus provided a means by which the advantages imparted by sulfur dioxide treatment of food products may be realized while simultaneously insuring that the deleterious side reactions of the sulfur dioxide are avoided.

Foods containing appreciable quantities of protein and carbohydrates often develop unusual flavors when subjected to high temperatures in canning operations, probably as a result of a protein-carbohydrate condensation. These undesirable flavors and odors can be inhibited or counteracted by treatment of the product with sulfur dioxide or soluble sulfites or bisulfites. Usually about 50-500 parts per million of sulfur dioxide or salts of sulfurous acid is added to the product to improve the flavor, odor, and palatability thereof. The sulfites which remain in the product, however, destroy thiamine naturally present in the food. The stabilized vitamin preparations of this invention are particularly useful in the enrichment of foods of this type which have been treated with sulfurous acid anhydride (sulfur dioxide) either in the form of a gas or a water solution of the gas for instance.

More specifically, there is provided by this invention a stabilized thiamine composition in a dry, edible form wherein the vitamin is incorporated in and dispersed throughout a matrix made up of insolubilized protein. A sulfite acceptor is also desirably incorporated in the matrix. The acceptor should be a material which does not deleteriously affect either the thiamine or the protein, but it should be an edible material and should function as a getter or acceptor of the objectionable sulfur derivatives. The protein is an excellent carrier for the vitamin, and provides a desirable foundation for the vitamin and sulfite acceptor since it is believed that the protein surrounds and envelops the vitamin, thus providing a protective barrier to the sulfite. Moreover, while the protein is not soluble in the liquid components of the food product to which it is added, it is broken down after ingestion by the digestive system, thus rendering the vitamin readily available.

The stabilized product is prepared by adding a small amount of the thiamine salt such as thiamine nitrate or thiamine acetate to a water solution of the protein. The aqueous solution of the protein and thiamine salt is vigorously agitated to insure distribution of the vitamin throughout the solution. When the vitamin has been distributed throughout the protein solution, an insolubilizing agent such as hexamethylene tetramine is added to promote insolubility of the protein. The sulfur dioxide acceptor is also incorporated in the protein solution, and the mixture is agitated vigorously so as to achieve thorough mixing before gelation occurs. The stabilized vitamin gel is then desirably spread out into sheets for drying. Drying may be effected by any of the means known in the art, and the dried product which is recovered in the form of a thin, brittle sheet can be further subdivided to any desired form such as flakes or particles of any size desired.

The following examples, which are included herein for purposes of illustration, show the preparation of the stabilized vitamin compositions.

Example I

A gelatin solution is prepared by stirring 100 grams of gelatin into 900 grams of cold water and the gel is agitated until the gelatin is thoroughly hydrated. The gel is then heated to about 120° F. until it is melted and 2 grams of thiamine mononitrate is added to the melted gel. An aqueous solution of hexamethylene tetramine (1 gram of hexamethylene tetramine in 9 grams of water) is added and the mixture is agitated for several minutes. The mixture is then vigorously agitated and a solution of 15 grams of ferric nitrate nonahydrate dissolved in 200 grams of water is added so as to achieve thorough mixing before gelation occurs. The mass is spread in sheet form and dried by any conventional method to produce thin brittle flakes. The flakes can be further subdivided by grinding to a particulate or powder form.

Example II

An egg white protein matrix is prepared by reconstituting 100 grams of foam dried egg white in 900 grams of water. 2 grams of thiamine hydrochloride is added to the egg white solution and the pH adjusted to about pH 5. A solution of 15 grams of ferric nitrate monohydrate dissolved in 200 grams of water is then stirred into the vitamin-containing solution. The stabilized mixture is then heated to a temperature of about 160° F. to coagulate the mixture. After drying the meal is divided to the desired size.

Example III

A solution of gelatin containing thiamine hydrochloride is prepared by soaking 100 grams of gelatin in 300 grams of water containing 2 grams of thiamine hydrochloride. After completion of hydration about 50 grams of dry corn sugar is added. The dry corn sugar is preferably added to the melted gelatin mass. The gelatin-vitamin mixture is liquefied by heating to about 120° F. The sticky mass which results is thoroughly mixed to distribute the components uniformly therethrough and a thin sheet of the mixture is formed. The sheet is then coated with an aqueous solution of ferric nitrate nonahydrate (5%) and the sheet is then dried in a stream of heated air. The dried sheets of the stabilized vitamin matrix are then ground to obtain a particulate or powder form.

Example IV

A solution containing 2 grams of thiamine nitrate dissolved in 75 grams of water was added to and thoroughly admixed with 100 grams of casein, the agitation being continued until a wet meal is formed. After permitting the meal to stand at room temperature until the thiamine compound has been thoroughly distributed throughout the protein, the meal is dried by conventional procedure. The dried casein meal is subdivided and the resulting powder is mixed in a 5% aqueous solution of ferric nitrate nonahydrate to form a red powder. After removal of water, the red powder may be incorporated in a food product.

The protein which acts as a carrier for the thiamine salt can be any edible protein which is easily insolubilized by insolubilizing agents or by heat. Protein compositions containing the simple proteins such as albumins, globulins, glutelins, prolamines and albuminoids and the conjugated proteins such as the phosphoproteins may be employed in the matrix.

Some of the protein compositions which may be employed in the formation of the protein matrix which supports and envelops the thiamine include vegetable proteins such as cottonseed protein, soybean protein, or peanut protein, as well as zein and gliadin, and animal proteins such as gelatin, casein, egg albumen, blood albumin, and other edible albumins. Insolubilizing agents which may be employed to convert the protein to the water insoluble form and inhibit diffusion of moisture to the thiamine molecule include, in addition to hexamethylene tetramine and corn sugar, aldo sugars, oxidized starch, and dialdehyde starch. Heat coagulable proteins may be insolubilized simply by heating, although this type of insolubilization should preferably be supplemented with one of the chemical insolubilizing agents to inhibit diffusion of moisture to the thiamine molecule. The amount of insolubilizing agent required to set up the protein depends upon the type of protein and it is within the ability of one skilled in the art to provide a sufficient amount of a given insolubilizing agent for a given protein composition.

Because only very small quantities of vitamins are usually required insofar as dietary requirements are concerned, it is generally satisfactory to incorporate from 0.01 to 15.0% based on the weight of the protein of the vitamin composition although it is preferred to incorporate 0.5 to 5% of the vitamin in the protein carrier.

Although there are many other oxidizing agents which act as acceptors or deactivators for the sulfurous acid salts, the acceptor must not be a composition which adversely affects either the thiamine or the protein. Iron salts, particularly ferric salts such as the nitrate, chloride, and sulfate, may be employed as the acceptor. The preferred acceptor is ferric nitrate. The ferric salt is incorporated in the protein matrix and serves the dual function of tanning the protein solution as well as functioning as an acceptor for the sulfur dioxide or the soluble sulfites. The amount of acceptor incorporated in the mixture is dependent upon the amount of free sulfur dioxide in the food product. At least equimolar amounts of the acceptor for the amount of sulfur dioxide present should generally be employed. For each gram molecular weight of sulfur dioxide remaining in the product one gram molecular weight of the acceptor should be employed. Larger amounts of the acceptor in excess of an equimolar amount may be employed without any adverse effect on the stabilized composition. In order to facilitate distribution of the acceptor, it is usually added to the vitamin-protein mixture in the form of an aqueous solution, although this is not required.

The stabilized vitamin composition is particularly useful for incorporation in protein-carbohydrate food products which are subjected to elevated temperatures such as in canning operations. Examples of the type of canned foods included within the scope of those advantageously treated with the stabilized vitamin composition are meat and cereal combinations, stew, corned beef hash, soups, spaghetti and meat, and pet foods. Any of these protein-carbohydrate foods may be treated with sulfur dioxide to incorporate around 50–500 parts per million of sulfur dioxide and preferably 100 parts per million of sulfur dioxide in the composition to improve taste and odor of the product. The thiamine which is destroyed by this operation is replaced and thiamine potency of the product is protected by the addition of about 10 pounds of the stabilized thiamine concentrate described previously in about 1,500 pounds of the food product.

The following example which shows the preparation of chicken fricassee illustrates the preparation of a protein-carbohydrate food product which may be treated with the stabilized vitamin composition of this invention.

Example V

The fricassee contains 50% raw disjointed fowl, 3% butter, and 47% gravy. The gravy is prepared by mixing dry flavoring ingredients such as salt seasoning and monosodium glutamate with enough water to form a slurry and then adding this slurry, with constant stirring and heating, to hot water until thickening of the gravy is complete. The gravy, along with the chicken meat, is filled into 1-pound cans which are processed for 75 minutes at 245° F.

In a similar manner, the following preparations containing meat and starch as major ingredients were formulated and processed:

| Product | Processing Time—Temperature |
| --- | --- |
| Chicken and Noodles | 75 minutes at 235° F. |
| Spaghetti and Meat Balls | 75 minutes at 245° F. |
| Corned Beef Hash | 100 minutes at 235° F. |
| Beef Stew | 105 minutes at 235° F. |

There is thus provided a method whereby the objectionable flavors resulting from heating protein-carbohydrate food products may be avoided by the known expedient of treating the food product with sulfur dioxide or a soluble sulfite and the adverse effect of the sulfur derivative can be readily avoided. The stabilized thiamine preparation is provided in a dried form for ease in handling and is also stabilized against a particular type of attack by a particular antagonist.

Obviously many modifications and variations of the invention hereinbefore set forth may be made without departing from the spirit and scope thereof, and therefore only such limitations should be imposed as are indicated in the appended claims.

We claim:

1. A vitamin preparation stabilized against destruction of vitamin potency by sulfur dioxide and soluble salts of sulfurous acid comprising: a protein matrix containing thiamine dispersed therein, said protein being modified by an insolubilizing agent, said protein also containing an acceptor for sulfur dioxide and soluble salts of sulfurous acid.

2. A vitamin preparation stabilized against destruction of vitamin potency by sulfur dioxide and soluble salts of sulfurous acid comprising: insolubilized gelatin containing a small amount of a thiamine salt and a sulfur dioxide acceptor in an amount sufficient to combine on an equimolar basis with said sulfur dioxide and sulfurous acid salts.

3. A vitamin preparation stabilized against destruction of vitamin potency by sulfur dioxide and soluble salts of sulfurous acid comprising: insolubilized casein containing a small amount of a thiamine salt and a sulfur dioxide acceptor in an amount sufficient to combine on an equimolar basis with said sulfur dioxide and sulfurous acid salts.

4. A vitamin enriching agent for food products comprising: thiamine dispersed throughout an insolubilized protein matrix, said matrix enveloping said thiamine, said matrix also containing an acceptor for soluble salts of sulfurous acid.

5. A method for preparing a vitamin enriching agent adapted for enriching food products which comprises: dissolving a water soluble salt of thiamine in a water solution of a protein, incorporating a protein insolubilizing agent in the protein-thiamine solution, and thoroughly dispersing said insolubilizing agent throughout said solution, adding a ferric salt to said solution while vigorously agitating said solution, and thereafter drying said solution to produce a protein matrix, and subsequently further subdividing said matrix to provide particles of said stabilized vitamin preparation.

6. A method of supplementing and protecting the thiamine content of a food product containing soluble sulfites or sulfur dioxide which comprises: incorporating in said food product a stabilized thiamine preparation comprising thiamine and a sulfite acceptor enveloped in an insolubilized protein carrier.

7. A method of replenishing the thiamine content of a food product containing added thiamine destroying agent which comprises: incorporating in said food product a small amount of a stabilized thiamine concentrate, said concentrate containing thiamine incorporated in an insolubilized animal protein gel, said insolubilized gel also containing ferric nitrate.

8. In the canning of food products which are treated with sulfurous acid derivatives to improve the odor and flavor thereof, the improvement which comprises adding to said food product a stabilized thiamine composition, said stabilized composition comprising an insolubilized vegetable protein gel containing thiamine and ferric nitrate.

9. A protein-carbohydrate food product containing available sulfur dioxide added to improve palatability, said food product being fortified with a stabilized thiamine composition, comprising thiamine and a sulfite acceptor enveloped by an insolubilized protein carrier.

10. A method for improving the color and flavor of a meat-containing protein-carbohydrate food product while maintaining the thiamine potency of said food product, comprising treating a meat-containing protein-carbohydrate food with about 50–500 parts per million of sulfur dioxide and incorporating in the sulfur dioxide treated food an insolubilized protein matrix having thiamine and a sulfur dioxide acceptor incorporated therein, said thiamine being thereby protected against degradation by soluble sulfites.

References Cited in the file of this patent

UNITED STATES PATENTS

| | | |
|---|---|---|
| 1,663,323 | Whatmough | Mar. 20, 1928 |
| 1,801,478 | Atwood | Apr. 21, 1931 |
| 1,879,762 | Nitardy | Sept. 27, 1932 |
| 2,322,270 | Atkin et al. | June 22, 1943 |